UNITED STATES PATENT OFFICE.

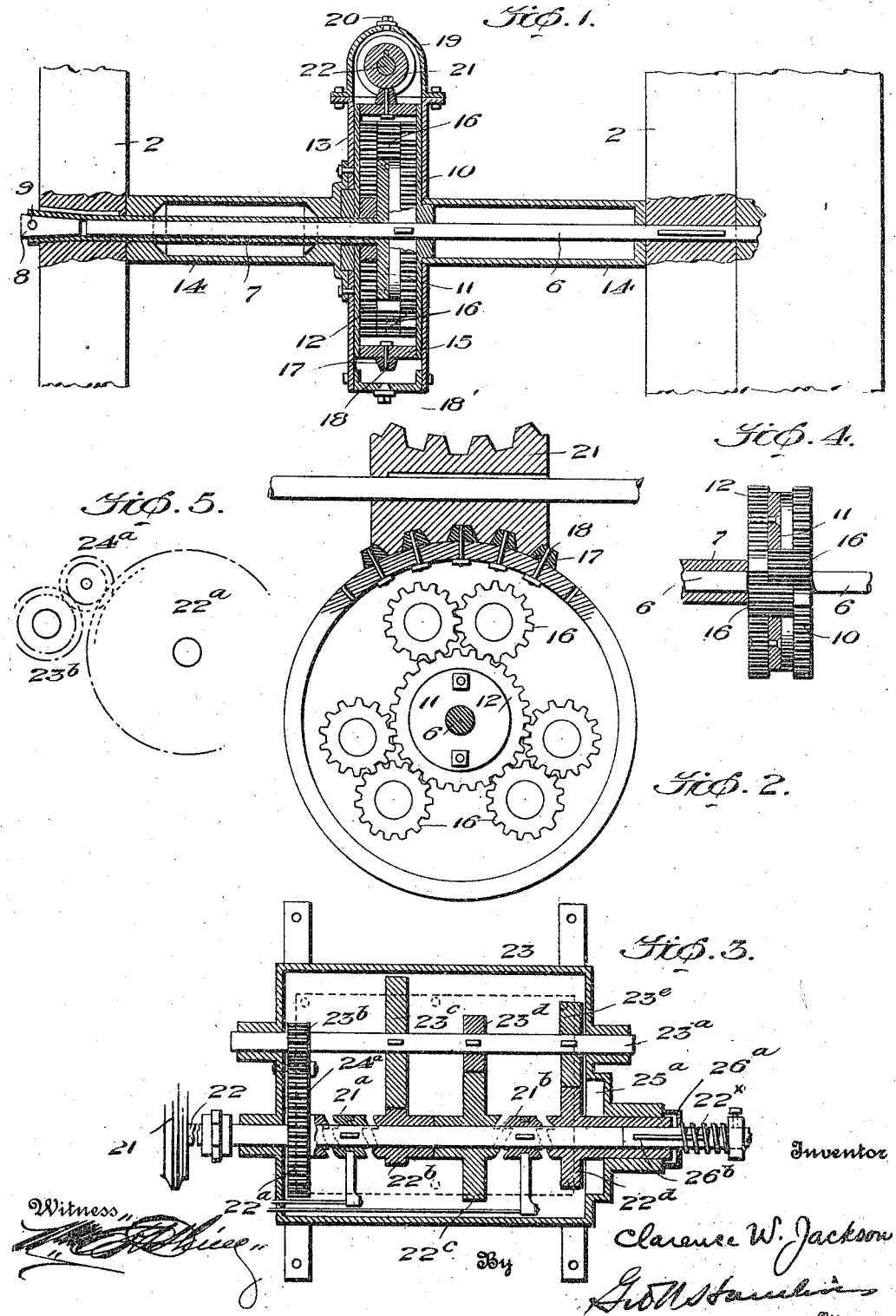

CLARENCE W. JACKSON, OF VALIER, MONTANA, ASSIGNOR OF FIFTY-FIVE ONE-HUNDREDTHS TO DAVID F. MAINS AND TWENTY-TWO AND ONE-HALF ONE-HUNDREDTHS TO ALVIN D. RIEDER, BOTH OF VALIER, MONTANA.

DRIVING-GEARING FOR TRACTORS.

1,255,314.          Specification of Letters Patent.         Patented Feb. 5, 1918.

Original application filed May 3, 1915, Serial No. 25,598. Divided and this application filed June 19, 1916. Serial No. 104,518.

*To all whom it may concern:*

Be it known that I, CLARENCE W. JACKSON, a subject of the King of Great Britain, (who has declared his intention of becoming a citizen of the United States,) residing at Valier, county of Teton, and State of Montana, have invented certain new and useful Improvements in Driving-Gearing for Tractors, of which the following is a specification.

This invention relates to driving gearing for tractors.

This application is a division of my application for tractor agricultural machines, filed May 3, 1915, Serial No. 25,598, and the invention has for its object the provision of novel driving gearing therefor which is practically noiseless and self-locking so that when the tractor is either ascending or descending an incline, the gearing is self-braking and no extraneous brakes are required. It also has other advantages which will appear more fully hereinafter.

The embodiments of the invention hereinafter set forth and shown in the accompanying drawings are to be considered as illustrative, rather than restrictive, of the scope of the invention, as modifications may be resorted to without departing from the essential principles thereof.

In the accompanying drawings;—

Figure 1 is a longitudinal section through the driving means for the rear traction wheels of a tractor;

Fig. 2, a detail view of the novel worm gearing and differential;

Fig. 3, a section taken through the transmission;

Fig. 4, a detail of the differential; and

Fig. 5, a detail of certain gears of the transmission.

The traction wheels 2 are of the usual construction. The solid shaft 6 is keyed to one of the traction wheels 2 and the tubular shaft 7 is loose on said shaft 6 and is keyed to the hub of the remaining traction wheel and expanded into engagement therewith by a taper plug 8 which is afterward secured by a pin 9. Keyed to the shaft 6 is the gear 10 constituting one part of the differential. Secured to the flange 11 is another gear 12 of the differential. The differential casing 13 is connected to the shaft casing 14 and contains the large worm wheel 15 which carries several spur gears, preferably six, indicated as 16 adapted to mesh with the gears 10 and 12. The gears 10 and 12 are contained within the worm wheel 15 and the latter is provided with hubs which are mounted on the solid shaft 6 and the hollow shaft 7. The worm wheel 15 is provided with truncated, conical, rotary or roller teeth 17 carried loosely on bolts 18. The lower part of the gear casing is provided with a suitable drain plug $18'$ and there is detachably connected to the top of said casing a worm casing 19 which has a filling plug 20 which may be removed for the introduction of oil within the gear casing. The worm 21 is of the concavo type adapted to mesh with several of the rotary teeth 17 and is carried by the shaft 22 which runs direct at the same speed as the motor 23 on the medium or work speed of the machine which is slightly under three miles per hour. The worm gearing described is practically noiseless and is self-locking so that when the machine is descending an incline, it is self-braking and no extraneous brakes are required.

The transmission gearing which is shown in Figs. 3 and 5, embodies improvements whereby the worm 21 is driven direct from the motor, without throwing in any intermediate gears, when operating at the normal or medium work speed, thereby eliminating the noise and wear incident to the use of gears hitherto used at work or medium speed.

The gears $22^a$, $22^b$, $22^c$, $22^d$, are loose on shaft 22. The double claw clutches $21^a$, $21^b$, are loosely splined to shaft 22 and may remain in neutral position or be engaged with said gears, according to the speed required. To the countershaft $23^a$ are secured the gears $23^b$, $23^c$, $23^d$, $23^e$, respectively meshing with idler gear $24^a$ and gears $22^b$, $22^c$, $22^d$.

Gear $22^d$ is slidable on shaft 22 and into a chamber $25^a$ and, when disposed therein, is out of mesh with gear $23^e$.

The gear $22^d$ is kept normally in mesh with gear $23^e$ by a spring surrounding motor shaft $22^x$ and pressing a cap $26^a$ against the end of the hub of gear $22^d$, said gear being loose on shaft 21 but slidably coupled by splining at $26^b$ to shaft $22^x$. Gears $23^e$ and 22$^d$ are always in mesh when running on "high," "low," and "reverse."

When the machine is to progress at work speed, the clutch 21$^b$ is slid into engagement with gear 22$^d$ and carried into chamber 25$^a$ and out of engagement with gear 23$^e$, thereby coupling shafts 22 and 22$^x$ and causing the worm 21 to be driven at the same speed as the motor without the use of any of the gears. Low speed for heavy work or high speed for travel on roads may be had by using the other gears.

Having thus described my invention, what I claim as new and desire to secure by Letters Patent, is:

Transmission and propulsion gearing comprising an engine or power shaft, a driven shaft, worm gearing driven by said driven shaft, a counter-shaft, gears on said counter-shaft, gears on the driven shaft, clutches for connecting different ones of the sets of gears of the driven shaft and countershaft for active operation, a spring actuated driving gear slidably coupled to the power shaft and normally meshing with a gear on the countershaft, and a clutch adapted for coupling said spring-actuated gear to the driven shaft and for shifting it out of mesh with its mating gear on the countershaft.

In testimony whereof, I hereunto affix my signature.

CLARENCE W. JACKSON.

Copies of this patent may be obtained for five cents each, by addressing the "Commissioner of Patents, Washington, D. C."